(12) United States Patent
Li et al.

(10) Patent No.: US 10,932,199 B2
(45) Date of Patent: Feb. 23, 2021

(54) METHOD AND TERMINAL FOR IMPLEMENTING UPLINK POWER CONTROL

(71) Applicant: ZTE CORPORATION, Guangdong (CN)

(72) Inventors: Weimin Li, Guangdong (CN); Bo Dai, Guangdong (CN); Yifei Yuan, Guangdong (CN); Huiying Fang, Guangdong (CN); Kun Liu, Guangdong (CN); Weiwei Yang, Guangdong (CN); Shupeng Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/762,064

(22) PCT Filed: Mar. 2, 2017

(86) PCT No.: PCT/CN2017/072852
§ 371 (c)(1),
(2) Date: Mar. 21, 2018

(87) PCT Pub. No.: WO2017/121408
PCT Pub. Date: Jul. 20, 2017

(65) Prior Publication Data
US 2018/0317180 A1  Nov. 1, 2018

(30) Foreign Application Priority Data

Jan. 11, 2016 (CN) .......................... 2016 1 0018690
Feb. 5, 2016 (CN) .......................... 2016 1 0081444

(51) Int. Cl.
*H04W 4/00* (2018.01)
*H04W 52/14* (2009.01)
(Continued)

(52) U.S. Cl.
CPC ....... *H04W 52/146* (2013.01); *H04W 52/242* (2013.01); *H04W 52/367* (2013.01); *H04W 72/085* (2013.01); *H04W 52/365* (2013.01)

(58) Field of Classification Search
CPC ............. H04W 52/146; H04W 52/242; H04W 52/367; H04W 72/085
(Continued)

(56) References Cited

U.S. PATENT DOCUMENTS 10,278,185 B2 * 4/2019 Wang .................... H04W 52/04
2013/0051352 A1 * 2/2013 Burstrom ............ H04W 52/146
370/329

(Continued)

FOREIGN PATENT DOCUMENTS

CN         102006657 A     4/2011
CN         102300303 A    12/2011
(Continued)

OTHER PUBLICATIONS

International Search Report dated Apr. 27, 2017, in corresponding International Application No. PCT/CN2017/072852.
(Continued)

*Primary Examiner* — Thai D Hoang
(74) *Attorney, Agent, or Firm* — Duane Morris LLP

(57) ABSTRACT

A method and a terminal for uplink power control are disclosed. The method comprising: determining the uplink transmit power by a terminal according to a transmission scenario in which the terminal belongs. In embodiments of present disclosure, uplink transmit power is determined by a terminal for uplink transmission, wherein a scheme of uplink power control is achieved.

3 Claims, 1 Drawing Sheet

```
                            ╱ 100
┌─────────────────────────────────────────────────────────┐
│ Determine uplink transmit power by a terminal according │
│      to the transmission scenario of the terminal       │
└─────────────────────────────────────────────────────────┘
                            │
                            ▼    ╱ 101
┌─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Perform uplink transmission by the terminal using the  │
│           determined uplink transmit power             │
└─ ─ ─ ─ ─ ─ ─ ─ ─ ─ ─ ─ ─ ─ ─ ─ ─ ─ ─ ─ ─ ─ ─ ─ ─ ─ ─ ─ ┘
```

(51) Int. Cl.
  *H04W 72/08* (2009.01)
  *H04W 52/24* (2009.01)
  *H04W 52/36* (2009.01)
(58) Field of Classification Search
  USPC ............... 370/252–253, 329–330, 335–337, 370/341–345
  See application file for complete search history.

(56) References Cited

U.S. PATENT DOCUMENTS

| | | | | |
|---|---|---|---|---|
| 2014/0087782 | A1* | 3/2014 | Zhang | H04W 52/242 455/522 |
| 2014/0161078 | A1* | 6/2014 | Zhang | H04W 52/146 370/329 |
| 2015/0105119 | A1* | 4/2015 | Eriksson | H04W 52/226 455/522 |
| 2016/0021620 | A1* | 1/2016 | Chen | H04W 4/70 455/522 |
| 2016/0142948 | A1* | 5/2016 | Bergstrom | H04W 24/08 370/332 |
| 2016/0219532 | A1* | 7/2016 | Li | H04W 16/14 |
| 2016/0323887 | A1* | 11/2016 | Patel | H04W 52/365 |
| 2016/0353387 | A1 | 12/2016 | Gao et al. | |
| 2017/0201950 | A1* | 7/2017 | Liu | H04B 7/0456 |
| 2017/0215027 | A1* | 7/2017 | Yokomakura | H04W 4/70 |
| 2017/0215159 | A1* | 7/2017 | Yokomakura | H04W 72/04 |
| 2017/0230160 | A1* | 8/2017 | Li | H04L 5/0048 |
| 2017/0303207 | A1* | 10/2017 | Awad | H04W 52/146 |
| 2018/0019784 | A1* | 1/2018 | Tidestav | H04B 1/525 |
| 2018/0035389 | A1* | 2/2018 | Hessler | H04W 52/245 |
| 2018/0041968 | A1* | 2/2018 | Otonari | H04W 52/241 |

FOREIGN PATENT DOCUMENTS

| | | | | |
|---|---|---|---|---|
| CN | 102348269 | A | 2/2012 | |
| CN | 103546955 | A | 1/2014 | |
| CN | 104812046 | A | 7/2015 | |
| EP | 3518452 | A1 * | 7/2019 | ........... H04L 5/0094 |

OTHER PUBLICATIONS

Official Action dated Sep. 26, 2019 in corresponding Chinese Patent Application No. 2016100814444.1.

* cited by examiner

METHOD AND TERMINAL FOR IMPLEMENTING UPLINK POWER CONTROL

TECHNICAL FIELD

The present application relates to, but is not limited to, wireless communication technology, and more particularly to a method and a terminal for implementing uplink power control.

BACKGROUND

In order to meet the coverage needs of harsh environments (such as indoor, basement, etc.), to reduce equipment power consumption and equipment costs, and to achieve large-scale deployment of low-complexity, low-speed communications equipment, 3GPP (Third Generation Partnership Project, Partner Program) conducted a feasibility study and evaluation of a cellular network IoT (Internet of Things) system which is based on a 200 kHz narrowband.

At present, Release 13 version of the LTE (Long Term Evolution) communication system is designing schemes and discussing the standardization of the technology of the NB-IoT (Narrowband Internet of Things) technology, which including the frame structure, uplink and downlink channels and signal design and so on. However, the uplink power control scheme for NB-IoT has not yet been designed.

SUMMARY

A summary of the subject matters described in the present disclosure will be given below. The scopes of the claims are not limited to the summary.

The embodiments of present disclosure provides a method and a apparatus of Ser. No. 18/708,593 uplink power control, capable of controlling uplink power.

The embodiments of present disclosure provide a method performed by a terminal for uplink power control. The method includes: determining an uplink transmit power according to a transmission scenario to which the terminal belongs.

In an exemplary embodiment, before determining the uplink transmit power, the method further comprising: determining the transmission scenario to which the terminal belongs according to at least one of the following factors: a transmission capability or mode, number of subcarriers, a coverage level, a channel type, and information to be transmitted.

In an exemplary embodiment, the transmission capability or mode comprises at least one of the following:
a single tone transmission of wherein a carrier bandwidth being a first bandwidth;
a single tone transmission of wherein a carrier bandwidth being a second bandwidth;
a multi-tone transmission of wherein a carrier bandwidth being a third bandwidth;
a multi-tone transmission of wherein a carrier bandwidth being a fourth bandwidth.

In an exemplary embodiment, the coverage level is one of a preset number of levels preset by system, the preset number is an integer greater than or equal to 1, and the levels comprise at least one of the followings: the levels indicating different coverage cases, the levels with different times of repetitions.

In an exemplary embodiment, the channel type comprises:
narrowband physical random access channel (NB-PRACH) or
narrowband physical uplink shared channel (NB-PUSCH);

In an exemplary embodiment, the information to be transmitted comprises at least one of:
a random access preamble;
a random access procedure message Msg3;
traffic data, uplink control information, or the traffic data and the uplink control information.

In an exemplary embodiment, the terminal determining the uplink transmit power according to the transmission scenario comprises:
when the transmission scenario to which the terminal belongs is a first coverage level and a random access preamble is to be transmitted through a narrowband physical random access channel (NB-PRACH), determining the uplink transmit power according to a first transmit power calculation formula and a first power control parameter; or
when the transmission scenario to which the terminal belongs is a second coverage level and a random access procedure message Msg3, traffic data, uplink control information, or the traffic data and the uplink control information are to be transmitted through a narrowband physical uplink shared channel (NB-PUSCH) in a single tone, determining the uplink transmit power according to a second transmit power calculation formula and a second power control parameter; or
when the transmission scenario to which the terminal belongs is a third coverage level and a random access procedure message Msg3, traffic data, uplink control information, or the traffic data and the uplink control information are to be transmitted through NB-PUSCH, determining the uplink transmit power according to a third transmit power calculation formula and a third power control parameter; or
when the transmission scenario to which the terminal belongs is a fourth coverage level, determining a maximum transmit power as the uplink transmit power; or
determining the uplink transmit power according to a coverage level to which the terminal belongs and relationship information between the coverage level and a power level preset by a system.

In an exemplary embodiment, when determining the uplink transmit power according to the coverage level to which the terminal belongs and the relationship information between the coverage level and the power level preset by the system, the method further comprising:
adjusting the uplink transmit power according to a transmit power control (TPC) command, wherein the adjustment comprises a cumulative adjustment and an absolute adjustment.

In an exemplary embodiment, wherein the first transmit power calculation formula comprises one of the following:

$$P=\min\{P\max, PL+\text{TargetPower}+(\text{Counter}-1)*\text{Step})\};$$

$$P=\min\{P\max, PL+\text{TargetPower}+\text{Delta}+(\text{Counter}-1)*\text{Step})\};$$

wherein P is the determined uplink transmit power, Pmax is a maximum transmit power of the terminal, PL is a downlink path loss estimated by the terminal, TargetPower is a preamble initial received target power for random access, Delta is a power offset, Counter is the number of random access, and Step is a power increment step.

In an exemplary embodiment, wherein the first power control parameter may include at least one of the following:

the preamble initial received target power for random access (TargetPower), the power increment step (Step) and the power offset (Delta).

In an exemplary embodiment, when different transmission capabilities or modes are used, the preamble initial received target powers (TargetPower) for random access are different; or the preamble initial received target powers (TargetPower) for random access are the same, the power offset (Delta) comprises a power demand deviation of different transmission capabilities or modes;

wherein the transmission capabilities or modes comprises at least one of the following: a single tone transmission of which a carrier bandwidth being a first bandwidth; a single tone transmission of which a carrier bandwidth being a second bandwidth; a multi-tone transmission of which a carrier bandwidth being a third bandwidth; a multi-tone transmission of which a carrier bandwidth being a fourth bandwidth.

In an exemplary embodiment, wherein the power offset (Delta) comprises a power demand deviation of different random access preambles.

In an exemplary embodiment, the power increment steps (Step) for different transmission capabilities or modes are different; or the power increment steps (Step) for different random access preambles are different.

In an exemplary embodiment, wherein the second transmit power calculation formula comprises one of the following formulas:

$$P=\min\{P\max,Po+PL\};$$

$$P=\min\{P\max,Po+PL+\text{Delta}\};$$

$$P=\min\{P\max,Po+PL+fi\};$$

$$P=\min\{P\max,Po+PL+\text{Delta}+fi\};$$

$$P=\min\{P\max,Po+\text{alpha}*PL\};$$

$$P=\min\{P\max,Po+\text{alpha}*PL+\text{Delta}\};$$

$$P=\min\{P\max,Po+\text{alpha}*PL+fi\};$$

$$P=\min\{P\max,Po+\text{alpha}*PL+\text{Delta}+fi\};$$

wherein P is the determined uplink transmit power, Pmax is a maximum transmit power of the terminal, Po is a target received power parameter, PL is a downlink path loss estimated by the terminal, alpha is a path loss compensation factor, Delta is a power offset, and fi is a power adjustment amount;

wherein the target received power parameter Po is a sum of common power parameter Po_nominal and a terminal specific power parameter Po_UE.

In an exemplary embodiment, wherein the second power control parameter comprises at least one of the following: the common power parameter Po_nominal, the terminal specific power parameter Po_UE, the path loss compensation factor alpha, and the power offset Delta and a transmit power control (TPC) parameter.

In an exemplary embodiment, wherein the third transmit power calculation formula comprises one of the following formulas:

$$P=\min\{P\max,Po+PL\};$$

$$P=\min\{P\max,Po+PL+\text{Delta}\};$$

$$P=\min\{P\max,Po+PL+fi\};$$

$$P=\min\{P\max,Po+PL+\text{Delta}+fi\};$$

$$P=\min\{P\max,Po+\text{alpha}*PL\};$$

$$P=\min\{P\max,Po+\text{alpha}*PL+\text{Delta}\};$$

$$P=\min\{P\max,Po+\text{alpha}*PL+fi\};$$

$$P=\min\{P\max,Po+\text{alpha}*PL+\text{Delta}+fi\};$$

$$P=\min\{P\max,10*\log 10(M)+Po+PL\};$$

$$P=\min\{P\max,10*\log 10(M)+Po+PL+\text{Delta}\};$$

$$P=\min\{P\max,10*\log 10(M)+Po+PL+fi\};$$

$$P=\min\{P\max,10*\log 10(M)+Po+PL+\text{Delta}+fi\};$$

$$P=\min\{P\max,10*\log 10(M)+Po+\text{alpha}*PL\};$$

$$P=\min\{P\max,10*\log 10(M)+Po+\text{alpha}*PL+\text{Delta}\};$$

$$P=\min\{P\max,10*\log 10(M)+Po+\text{alpha}*PL+fi\};$$

$$P=\min\{P\max,10*\log 10(M)+Po+\text{alpha}*PL+\text{Delta}+fi\};$$

wherein P is the determined uplink transmit power, Pmax is a maximum transmit power of the terminal, Po is a target received power parameter, PL is a downlink path loss estimated by the terminal, alpha is a path loss compensation factor, Delta is a power offset, and fi is a power adjustment amount;

wherein M is a transmission resource bandwidth and comprises at least one of the following: number of subcarriers, number of resource units, and number of resource blocks;

wherein the target received power parameter Po is a sum of common power parameter Po_nominal and a terminal specific power parameter Po_UE.

In an exemplary embodiment, wherein the third power control parameter comprises at least one of the following: the transmission resource bandwidth M, the common power parameter Po_nominal, the terminal specific power parameter Po_UE, the path loss compensation factor alpha, the power offset Delta, and a transmit power control (TPC) parameter.

In an exemplary embodiment, wherein the random access procedure message Msg3, the traffic data, the uplink control information, or the traffic data and the uplink control information are to be transmitted through the NB-PUSCH further comprises:

the random access procedure message Msg3, the traffic data, the uplink control information, or the traffic data and the uplink control information are to be transmitted through the NB-PUSCH by using a single-tone transmission, and the transmission resource bandwidth M being 1.

In an exemplary embodiment, when different transmission capabilities or modes are used, at least one of the following situations exist:

the path loss compensation factors alpha are different;

the common power parameters Po_nominal are different; or the common power parameters Po_nominal are the same;

wherein, when the common power parameters Po_nominal are the same, the terminal specific power parameter Po_UE comprises a power demand deviation of different transmission capabilities or modes; or the power offset Delta comprises a power demand deviation of different transmission capabilities or modes; or the power adjustment amount fi comprises a power demand deviation of different transmission capabilities or modes; or the value of transmission resource bandwidth M is set according to a difference between a bandwidth of a preconfigured transmission capability or mode and a bandwidth of one of various transmission capabilities or modes;

wherein the transmission capability or mode comprises at least one of the following: a single tone transmission of which a carrier bandwidth being a first bandwidth, a single tone transmission of which a carrier bandwidth being a second bandwidth, a multi-tone transmission of which a carrier bandwidth being a third bandwidth, and a multi-tone transmission of which a carrier bandwidth being a fourth bandwidth.

In an exemplary embodiment, after determining the uplink transmit power, the method further comprising: performing an uplink transmission using the determined uplink transmit power.

In an exemplary embodiment, further comprising:
generating a power headroom report (PHR) according to a preconfigured transmission scenario and transmitting the power headroom report through NB-PUSCH,
wherein the preconfigured transmission scenario comprises at least one of the following:
a single tone transmission;
a channel type being NB-PUSCH;
transmitting traffic data, uplink control information, or the traffic data and the uplink control information.

In an exemplary embodiment, the present disclosure also provides a terminal for implementing uplink power control, comprising:
a power determination unit, configured to determine uplink transmit power based on a transmission scenario to which the terminal belongs.

In an exemplary embodiment, further comprising a scenario determination unit, configured to determine the transmission scenario to which the terminal belongs according to at least one of the following factors:
transmission capability or mode, number of subcarriers, coverage level, channel type, and information to be transmitted.

In an exemplary embodiment, wherein the power determination unit configured to determine the uplink transmit power according to the transmission scenario to which the terminal belongs further comprising:

when the transmission scenario to which the terminal belongs is a first coverage level and a random access preamble is to be transmitted through a narrowband physical random access channel (NB-PRACH), determining the uplink transmit power according to a first transmit power calculation formula and a first power control parameter; or when the transmission scenario to which the terminal belongs is a second coverage level and a random access procedure message Msg3, traffic data, uplink control information, or the traffic data and the uplink control information are to be transmitted through NB-PUSCH in a single tone, determining the uplink transmit power according to a second transmit power calculation formula and a second power control parameter; or when the transmission scenario to which the terminal belongs is a third coverage level and a random access procedure message Msg3, traffic data, uplink control information, or the traffic data and the uplink control information are to be transmitted through NB-PUSCH, determining the uplink transmit power according to a third transmit power calculation formula and a third power control parameter; or when the transmission scenario to which the terminal belongs is a fourth coverage level, determining a maximum transmit power as the uplink transmit power; or determining the uplink transmit power according to a coverage level to which the terminal belongs and relationship information between the coverage level and a power level preconfigured by a system.

In an exemplary embodiment, further comprising an adjustment unit, configured to adjust the uplink transmit power according to a transmit power control (TPC) command when the power determination unit determines the uplink transmit power according to the coverage level to which the terminal belongs and the relationship information between the coverage level and a power level preset by the system, wherein the adjustment comprises a cumulative adjustment and an absolute adjustment.

In an exemplary embodiment, further comprising an execution unit, configured to perform uplink transmission using the determined uplink transmit power after the power determination unit determines the uplink transmit power.

The embodiment of present disclosure also provides a computer readable storage medium which store program codes for performance. The storage medium can be configured to store program codes for performing the method steps according to the above embodiments.

Comparing with related prior art, the embodiment of present disclosure comprises: a terminal determine uplink transmit power according to a scenario which the terminal belongs. In embodiment of present disclosure, a terminal determines uplink transmit power for uplink transmission, which realize a scheme of uplink power control.

The other aspects will be apparent from the following drawings and detail description.

BRIEF DESCRIPTION OF THE DRAWINGS

The accompanying drawings, which are hereby incorporated by reference, provide a further understanding of the present application and constitute a part of this application, and the illustrative embodiments of the present application and its description are intended to be illustrative of the present application and are not to be construed as being unduly limited to this application. In the drawings.

DETAILED DESCRIPTION

Embodiments hereinafter of the present application will be described in detail with reference to the accompanying drawings. It is to be noted that the features of the embodiments and examples in the present application may be combined with each other randomly without conflict.

Figure 1:
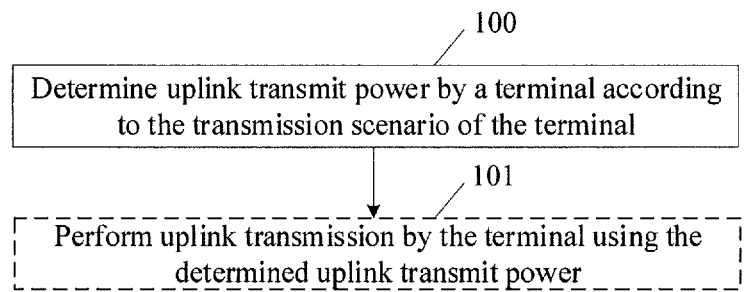
FIG. 1 is a flow chart of a method for implementing an uplink power control according to an embodiment of the present invention.

FIG. 1 is a flow chart of a method for implementing an uplink transmit power control according to an embodiment of the present invention, as shown in FIG. 1.

In step 100, the terminal determines the uplink transmit power according to the transmission scenario to which the terminal belongs;

In an exemplary embodiment, prior to the present step, the method of the embodiment of the present invention may further include determining a transmission scenario to which the terminal belongs according to at least one of the following factors: transmission capability or mode, the number of subcarriers, coverage level, channel type, and information to be transmitted.

In an exemplary embodiment, the coverage level may be one of a preset number of levels preset by the system, wherein the preset number is an integer greater than or equal to 1, and the levels include at least: the levels indicating different coverage cases, the levels with different number of repetitions.

In an exemplary embodiment, the channel type may include: narrowband physical random access channel (NB-PRACH) or narrowband physical uplink shared channel (NB-PUSCH).

In an exemplary embodiment, the information to be transmitted may include: random access preamble, or random access procedure message Msg3, or traffic data, or uplink control information, or traffic data and uplink control information.

In an exemplary embodiment, the transmission capability or mode may include: a single tone transmission of which a carrier bandwidth being a first bandwidth, a single tone (or single carrier) transmission of which a carrier bandwidth being a second bandwidth, a multi-tone transmission of which a carrier bandwidth being a third bandwidth, a multi-tone (or multi-carrier) transmission of which a carrier bandwidth being a fourth bandwidth.

The first bandwidth may be different from the second bandwidth, for example, the first bandwidth may be 3.75 kHz, the second bandwidth may be 15 kHz. The third bandwidth may be different from the fourth bandwidth, for example, the third bandwidth may be 1.25 kHz, and the fourth bandwidth can be 15 kHz and the like. The transmission capability or mode of a terminal may only support a single tone transmission, or support a multi-tone transmission. A terminal that supports a multi-tone transmission may also adopt a single tone transmission.

It is to be noted that determining the transmission scenario to which the terminal belongs can be achieved by: the terminal determines its transmission capability or mode according to its transmission capability or mode configuration information. The terminal determines the number of subcarriers for uplink transmission according to whether it adopts a single tone transmission or a multi-tone transmission, and system configuration information or scheduling information. The terminal determines the coverage level according to the system preset coverage level and the measurement result of the downlink reference signal. The terminal determines the channel type and the information to be transmitted according to its uplink transmission procedure. Thus, after the terminal determines one or more factors such as its transmission capability or mode, the number of subcarriers, coverage level, channel type, information to be transmitted, it may determine the transmission scenario to which it belongs.

In an exemplary embodiment, determining the uplink transmit power according to the transmission scenario to which the terminal belongs may include:

when the transmission scenario to which the terminal belongs is a first coverage level and the random access preamble is to be transmitted through the NB-PRACH, the uplink transmit power is determined according to a first transmit power calculation formula and a first power control parameter; or when the transmission scenario to which the terminal belongs is a second coverage level and the random access procedure message Msg3, the traffic data, the uplink control information, or the traffic data and the uplink control information are to be transmitted through the NB-PUSCH in a single tone, the uplink transmit power is determined according to a second transmit power calculation formula and a second power control parameter; or when the transmission scenario to which the terminal belongs is a third coverage level and the random access procedure message Msg3, the traffic data, the uplink control information, or the traffic data and the uplink control information are to be transmitted through the NB-PUSCH, the uplink transmit power is determined according to a third transmit power calculation formula and a third power control parameter; or when the transmission scenario to which the terminal belongs is a fourth coverage level, it is determined that a maximum transmit power is the uplink transmit power; or the uplink transmit power is determined according to the coverage level to which the terminal belongs and relationship information between the coverage level and a power level preset by the system.

It is to be noted that the first coverage level, the second coverage level, the third coverage level, and the fourth coverage level are used only for the description of the distinction, and do not have a strict order relationship, nor are they completely different. One possible case is that the first coverage level, the second coverage level and the third coverage level represent the same one or more coverage levels, and the fourth coverage level represents another one or more coverage levels.

It is also to be noted that the first transmit power calculation formula, the second transmit power calculation formula, and the third transmit power calculation formula may be the transmit power calculation formulas preset by the system. The first power control parameter, the second power control parameter, the third power control parameter may include a parameter configured by the system through signaling and transmitted to the terminal, or a preset parameter by the system.

It is also to be noted that the concept of maximum transmit power is a common knowledge of those skilled in the art.

It is also to be noted that the relationship information between the coverage level and the power level preset by the system may be a relationship table between the coverage level and the power level preset by the system.

In an exemplary embodiment, when determining the uplink transmit power according to the coverage level to which the terminal belongs and the relationship information between the coverage level and the power level preset by the system, the method of the embodiment of the present invention may further comprise: the terminal adjusts the uplink transmit power according to the transmit power control (TPC) command, and the adjustment includes a cumulative adjustment and an absolute adjustment.

In an exemplary embodiment, the first transmit power calculation formula may be one of the following:

$$P=\min\{P\max, PL+\text{TargetPower}+(\text{Counter}-1)*\text{Step})\};$$

$$P=\min\{P\max, PL+\text{TargetPower}+\text{Delta}+(\text{Counter}-1)*\text{Step})\};$$

wherein, P is the determined uplink transmit power, Pmax is a maximum transmit power of the terminal, PL is a downlink path loss estimated by the terminal, TargetPower is a preamble initial received target power for random access, Delta is a power offset, Counter is the number of random access, Step is a power increment step.

In an exemplary embodiment, the first power control parameter may include at least one of: the preamble initial received target power for random access TargetPower, the power increment step Step, the power offset Delta;

wherein, the preamble initial received target power for random access TargetPower is configured by the system and notified by signaling, the power increment step Step is configured by the system and notified by signaling or is preset by the system, the power offset Delta is configured by the system and notified by signaling or is preset by the system.

In an exemplary embodiment, when different transmission capabilities or modes are used, the preamble initial received target powers for random access TargetPower are different; or the preamble initial received target powers for random access TargetPower are the same, the power offset Delta includes a power demand deviation of different transmission capabilities or modes.

The transmission capabilities or modes may include at least one of the following: a single tone transmission of which a carrier bandwidth being a first bandwidth, a single tone transmission of which a carrier bandwidth being a second bandwidth, a multi-tone transmission of which a carrier bandwidth being a third bandwidth, a multi-tone transmission of which a carrier bandwidth being a fourth bandwidth.

In an exemplary embodiment, the power offset Delta can comprise a power demand deviation of different random access preambles.

In the exemplary embodiment, the power increment steps Step for different transmission capabilities or modes are different; or the power increment steps Step for different random access preambles are different;

wherein when different transmission capabilities or modes and different random access preambles are used simultaneously, the power increment steps Step are different.

In an exemplary embodiment, the second transmit power calculation formula may be one of the following formulas:

$P=\min\{P\max, Po+PL\};$ $P=\min\{P\max, Po+PL+\text{Delta}\};$ $P=\min\{P\max, Po+PL+fi\};$ $P=\min\{P\max, Po+PL+\text{Delta}+fi\};$ $P=\min\{P\max, Po+\text{alpha}*PL\};$ $P=\min\{P\max, Po+\text{alpha}*PL+\text{Delta}\};$ $P=\min\{P\max, Po+\text{alpha}*PL+fi\};$ $P=\min\{P\max, Po+\text{alpha}*PL+\text{Delta}+fi\};$ wherein, P is the determined uplink transmit power, Pmax is a maximum transmit power of the terminal, Po is a target received power parameter, PL is a downlink path loss estimated by the terminal, alpha is a path loss compensation factor, Delta is a power offset, fi is a power adjustment amount;

wherein, the target received power parameter Po is the sum of a common power parameter Po_nominal and a terminal specific power parameter Po_UE.

In an exemplary embodiment, the second power control parameter may include at least one of: common power parameter Po_nominal, terminal specific power parameter Po_UE, path loss compensation factor alpha, power offset Delta and transmit power control TPC.

wherein, the common power parameter Po_nominal is configured by the system and notified by signaling; the terminal specific power parameter Po_UE is configured by the system and notified by signaling or is preset by the system; the path loss compensation factor alpha is configured by the system and notified by signaling or is preset by the system; the power offset Delta is configured by the system and notified by signaling or is preset by the system; the transmit power control TPC is configured by the system and notified by signaling.

The second transmit power calculation formula may be one of the following formulas when the transmission scenario to which the terminal belongs is a second coverage level and the uplink control information is to be transmitted by the NB-PUSCH using a single tone:

$P=\min\{P\max, Po+PL\};$ $P=\min\{P\max, Po+PL+\text{Delta}\};$ $P=\min\{P\max, Po+PL+fi\};$ $P=\min\{P\max, Po+PL+\text{Delta}+fi\}.$ In an exemplary embodiment, the third transmit power calculation formula may be one of the following formulas:

$P=\min\{P\max, Po+PL\};$ $P=\min\{P\max, Po+PL+\text{Delta}\};$ $P=\min\{P\max, Po+PL+fi\};$ $P=\min\{P\max, Po+PL+\text{Delta}+fi\};$ $P=\min\{P\max, Po+\text{alpha}*PL\};$ $P=\min\{P\max, Po+\text{alpha}*PL+\text{Delta}\};$ $P=\min\{P\max, Po+\text{alpha}*PL+fi\};$ $P=\min\{P\max, Po+\text{alpha}*PL+\text{Delta}+fi\};$ $P=\min\{P\max, 10*\log 10(M)+Po+PL\};$ $P=\min\{P\max, 10*\log 10(M)+Po+PL+\text{Delta}\};$ $P=\min\{P\max, 10*\log 10(M)+Po+PL+fi\};$ $P=\min\{P\max, 10*\log 10(M)+Po+PL+\text{Delta}+fi\};$ $P=\min\{P\max, 10*\log 10(M)+Po+\text{alpha}*PL\};$ $P=\min\{P\max, 10*\log 10(M)+Po+\text{alpha}*PL+\text{Delta}\};$ $P=\min\{P\max, 10*\log 10(M)+Po+\text{alpha}*PL+fi\};$ $P=\min\{P\max, 10*\log 10(M)+Po+\text{alpha}*PL+\text{Delta}+fi\};$ wherein, P is the determined uplink transmit power, Pmax is a maximum transmit power of the terminal, Po is a target received power parameter, PL is a downlink path loss estimated by the terminal, alpha is a path loss compensation factor, Delta is a power offset, fi is a power adjustment amount;

wherein, M is the transmission resource bandwidth, and the transmission resource bandwidth M may include at least one of the following: the number of subcarriers, the number of resource units, the number of resource blocks.

wherein, the target received power parameter Po is the sum of a common power parameter Po_nominal and a terminal specific power parameter Po_UE.

In an exemplary embodiment, the third power control parameter may include at least one of: transmission resource bandwidth M, common power parameter Po_nominal, terminal specific power parameter Po_UE, path loss compensation factor alpha, power offset Delta, transmit power control TPC.

wherein, the transmission resource bandwidth M is configured by the system and notified by signaling or is preset by the system; the common power parameter Po_nominal is configured by the system and notified by signaling; the terminal specific power parameter Po_UE is configured by the system and notified by signaling or is preset by system; the path loss compensation factor alpha is configured by the system and notified by signaling or is preset by the system; the power offset Delta is configured by the system and notified by signaling or is preset by the system; the transmit power control TPC is configured by the system and notified by signaling.

It is to be noted that the second transmit power calculation formula and the third transmit power calculation formula may be the same or different.

The third transmit power calculation formula may be one of the following formulas when the transmission scenario in which the terminal belongs is a third coverage level, and the traffic data, or the traffic data and uplink control information are to be transmitted through the NB-PUSCH:

$P=\min\{P\max,10*\log 10(M)+Po+\mathrm{alpha}*PL\}$;

$P=\min\{P\max,10*\log 10(M)+Po+\mathrm{alpha}*PL+\mathrm{Delta}\}$;

$P=\min\{P\max,10*\log 10(M)+Po+\mathrm{alpha}*PL+fi\}$;

$P=\min\{P\max,10*\log 10(M)+Po+\mathrm{alpha}*PL+\mathrm{Delta}+fi\}$.

In an exemplary embodiment, the terminal transmits the random access procedure message Msg3, the traffic data, the uplink control information, or the traffic data and the uplink control information through the NB-PUSCH may include: the terminal transmits the random access procedure message Msg3, the traffic data, the uplink control information, or the traffic data and the uplink control information through the NB-PUSCH by using a single-tone transmission, and the transmission resource bandwidth M is 1.

In an exemplary embodiment, when different transmission capabilities or modes are used, there can be at least one of the following situations:

the path loss compensation factors alpha are different;

the common power parameters Po_nominal are different, or the common power parameters Po_nominal are the same;

wherein, when the common power parameters Po_nominal are the same, the terminal specific power parameter Po_UE includes a power demand deviation of different transmission capabilities or modes, or the power offset Delta includes a power demand deviation of different transmission capabilities or modes, or the power adjustment amount fi includes a power demand deviation of different transmission capabilities or modes, or the value of transmission resource bandwidth M is set according to a difference between a bandwidth of a preconfigured transmission capability or mode and a bandwidth of one of various transmission capabilities or modes;

wherein, when different transmission capabilities or modes are used, one of the following situations may exist:

the path loss compensation factors alpha are different, or the common power parameters Po_nominal are different, or the common power parameters Po_nominal are the same;

the path loss compensation factors alpha are different and the common power parameters Po_nominal are different, or the common power parameters Po_nominal are the same;

the path loss compensation factors alpha are different and the common power parameters Po_nominal are the same, or the common power parameters Po_nominal are different;

wherein, the transmission capabilities or modes may include at least one of the following: a single tone transmission of which a carrier bandwidth being a first bandwidth, a single tone transmission of which a carrier bandwidth being a second bandwidth, a multi-tone transmission of which a carrier bandwidth being a third bandwidth, a multi-tone transmission of which a carrier bandwidth being a fourth bandwidth.

The terminal specific power parameter Po_UE includes a power demand deviation of different transmission capabilities or modes, which means that the terminal specific power parameter Po_UE is used to carry the power demand deviation of different transmission capabilities or modes. The power offset Delta includes a power demand deviation of different transmission capabilities or modes, which means that the power offset Delta is used to carry the power demand deviation of different transmission capabilities or modes, which may be configured by the system and notified by signaling or is preset by system. The power adjustment amount fi includes a power demand deviation of different transmission capabilities or modes, which comprises that initializing the power adjustment amount fi according to the power demand deviation of different transmission capabilities or modes. The value of transmission resource bandwidth M is set according to a difference between a bandwidth of a preconfigured transmission capability or mode and a bandwidth of one of various transmission capabilities or modes, which includes that setting the value of transmission resource bandwidth M according to the preset transmission capability or mode, and for other transmission capabilities or modes having a bandwidth different from the preset transmission capability or mode, setting the value of transmission resource bandwidth M according to the bandwidth difference. For example, setting transmission through 3.75 kHz carrier bandwidth as a benchmark, when the 15 kHz carrier bandwidth is used for single carrier transmission, the value of transmission resource bandwidth M value is set to 4. For another example, setting transmission through 15 kHz carrier bandwidth as a benchmark, when the 3.75 kHz carrier bandwidth is used for single carrier transmission, the value of the transmission resource bandwidth M is set to ¼.

It is to be noted that in the embodiment of the present invention, the maximum transmit power Pmax of the terminal is set by the system; the path loss compensation factor alpha=1 indicates full path loss compensation, 0<alpha<1 indicates partial path loss compensation, and alpha=0 indicates that the uplink transmit power of the terminal is determined entirely according to the power control parameters notified by the system through signaling. The power adjustment fi is initialized according to the system preset rule and is calculated according to the power adjustment method and the power adjustment step corresponding to the transmit power control (TPC) command. The power adjustment method includes the cumulative adjustment method and the absolute adjustment method.

In an exemplary embodiment, after determining the uplink transmit power, the method of the embodiment of the present invention may further comprise: step 101, the terminal performs uplink transmission using the determined uplink transmit power.

In an exemplary embodiment, the method of the embodiment of the present invention may further comprise:

The terminal determines the power headroom report (PHR) according to a preconfigured transmission scenario and transmits the power headroom report through the NB-PUSCH.

Wherein the preconfigured transmission scenario may include at least one of: single tone transmission, channel type is NB-PUSCH, transmitting both or either of traffic data and uplink control information.

It is to be noted that the preconfigured transmission scenario is used for the terminal to determine its uplink transmit power in the scenario. Further, the terminal may determine its power headroom report in the scenario based on the maximum transmit power and the determined uplink transmit power. For example, the preconfigured transmission scenario is using a single tone to transmit the traffic data through the NB-PUSCH, the terminal determines its uplink transmit power according to the preconfigured transmission scenario, and then uses the difference between the maximum transmit power and the determined uplink transmit power as its PHR in the scenario.

The method of implementing the uplink power control according to the embodiments of the present invention may be applied to a narrowband internet of things (NB-IoT).

In the technical schemes of the present invention, the uplink transmit power is determined by the terminal and then the uplink transmission is carried out, and the design of the uplink power control scheme is realized.

Figure 2:
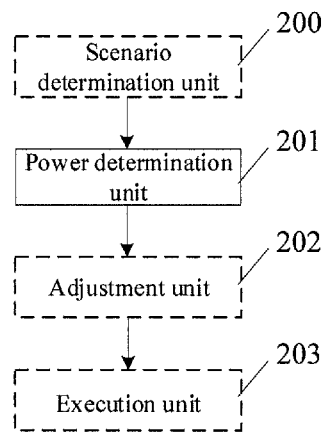
FIG. 2 is a block diagram showing the structure of a terminal for implementing an uplink power control according to an embodiment of the present invention.

FIG. 2 is a block diagram of a terminal for implementing uplink power control according to an embodiment of the present invention. As shown in FIG. 2, the terminal at least includes a power determination unit 201 which is configured to determine uplink transmit power according to a transmission scenario to which the terminal belongs.

In an exemplary embodiment, the power determination unit 201 may be configured to:

when the transmission scenario to which the terminal belongs is a first coverage level and the random access preamble is to be transmitted through the NB-PRACH, the uplink transmit power is determined according to a first transmit power calculation formula and a first power control parameter; or when the transmission scenario to which the terminal belongs is a second coverage level and the random access procedure message Msg3, the traffic data, the uplink control information, or the traffic data and the uplink control information are to be transmitted through the NB-PUSCH in a single tone, the uplink transmit power is determined according to a second transmit power calculation formula and a second power control parameter; or when the transmission scenario to which the terminal belongs is a third coverage level and the random access procedure message Msg3, the traffic data, the uplink control information, or the traffic data and the uplink control information are to be transmitted through the NB-PUSCH, the uplink transmit power is determined according to a third transmit power calculation formula and a third power control parameter; or when the transmission scenario to which the terminal belongs is a fourth coverage level, determining a maximum transmit power is the uplink transmit power; or the uplink transmit power is determined according to a coverage level to which the terminal belongs and relationship information between the coverage level and a power level preset by the system.

The terminal of the embodiment of the present invention may further include an adjustment unit 202, which is configured to adjust the uplink transmit power according to the transmit power control (TPC) command when the power determination unit 201 determines the uplink transmit power according to the coverage level to which the terminal belongs and the relationship information between the coverage level and the power level preset by the system, wherein the adjustment includes a cumulative adjustment and an absolute adjustment.

The terminal of the embodiment of the present invention may further include an execution unit 203, which is configured to perform uplink transmission using the determined uplink transmit power after the power determination unit 201 determines the uplink transmit power.

The terminal of the embodiment of the present invention may further include a scenario determination unit 200, which is configured to determine a transmission scenario to which the terminal belongs according to at least one of the following factors: transmission capability or mode, the number of subcarriers, coverage level, channel type and information to be transmitted.

In an exemplary embodiment, the terminal that implements the uplink power control may be a terminal in the NB-IoT.

The method of the present application is described in more detail by way of a number of application examples, wherein the application examples are merely illustrative of the present application and are not intended to limit the scope of the present application.

Application Example 1

Figure 3:
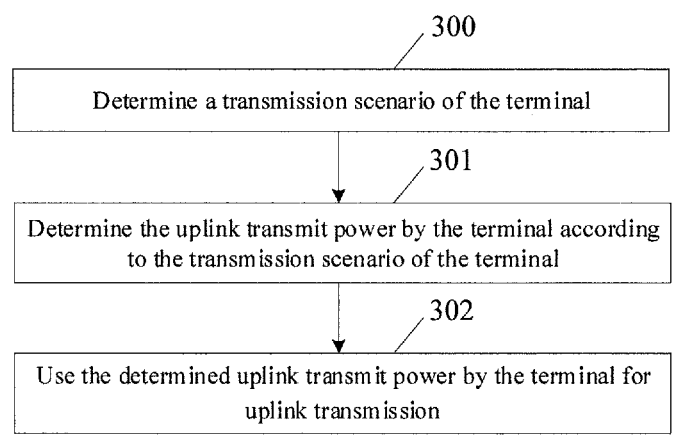
FIG. 3 is a flow chart of the method of application example 1 of the present application.

The flow diagram of the application example 1 of the present application is shown in FIG. 3, and the method of the present application example includes:

In step 300, determining a transmission scenario to which the terminal belongs;

the terminal determines the transmission scenario to which the terminal belongs according to one or more of the factors such as the transmission capability or mode, the number of subcarriers, the coverage level, the channel type, the information to be transmitted, and the like.

The transmission capability or mode includes at least one of the following: single tone transmission of which the carrier bandwidth being a first bandwidth, single tone transmission of which the carrier bandwidth being a second bandwidth, the multi-tone transmission of which the carrier bandwidth being a third bandwidth, the multi-tone transmission of which the carrier bandwidth being a fourth bandwidth.

The first bandwidth may be different from the second bandwidth, for example, the first bandwidth may be 3.75 kHz, the second bandwidth may be 15 kHz, and the third bandwidth may be different from the fourth bandwidth, for example, the third bandwidth may be 1.25 kHz, the fourth bandwidth may be 15 kHz. The transmission capability or mode of the terminal may only support single tone transmission, or may support multi-tone transmission. The terminal which supports multi-tone transmission may also use a single tone transmission. The terminal can determine its transmission capability or mode according to its configuration information of transmission capability or mode.

When the terminal uses a single tone transmission, the number of subcarriers is 1. When the terminal uses a multi-tone transmission, the number of subcarriers is M, M is greater than 1 and less than or equal to the maximum number of subcarriers. The terminal may determine the number of subcarriers according to the system configuration information or scheduling information. For example, when the terminal transmits a hybrid automatic repeat request (HARQ) feedback information (e.g., acknowledgment (ACK)/non-acknowledgment (NACK)) through a narrowband physical uplink shared channel (NB-PUSCH), the terminal uses a single tone transmission, and the number of subcarriers is 1. When the terminal transmits the traffic data through NB-PUSCH, multi-tone transmission is carried out using M subcarriers according to the system scheduling information.

The coverage level may be one of a preset number of levels preset by the system, wherein the preset number is an integer greater than or equal to 1, and the levels include at least the levels indicating different coverage cases, the levels with different number of repetitions. For example, in this application example, assuming that the system preset three levels, namely, coverage level 1, coverage level 2, coverage level 3, and the maximum coupling loss (MCL) corresponding to these three coverage levels are, for example, 144 dB, 154B and 164B respectively. These three coverage levels may also be named as the normal coverage level, the extended coverage level and the extreme coverage level. Or these coverage levels may also be named as the basic coverage level, the robust coverage level and the extreme coverage level. The coverage level 1 may be used as a non-enhanced coverage level, the coverage level 2 and the coverage level 3 may be used as enhanced coverage levels, the coverage level 3 may be used as the highest coverage level. The terminal may determine its coverage level according to the downlink measurement results. Terminals of different coverage levels may use different repetition times or repetition levels to transmit data.

The channel type includes narrowband physical random access channel (NB-PRACH) or narrowband physical uplink shared channel (NB-PUSCH). NB-PRACH is used to transmit random access preamble for random access, NB-PUSCH is used to transmit uplink traffic data, uplink control information, or uplink traffic data and uplink control information. The uplink control information includes HARQ feedback information (e.g., ACK/NACK information) and the like.

After the terminal determines one or more factors of its transmission capability or mode, number of subcarriers, coverage level, channel type, information to be transmitted and other factors, the transmission scenario to which the terminal belongs may be determined.

In this application example, for example, the terminal determines, based on its transmission capability or mode configuration information, that it only supports a single tone transmission (where the number of subcarriers is 1) of which a carrier bandwidth being a first bandwidth (e.g., 3.75 kHz), and determines that its coverage level is the coverage level 3, and the uplink control information is to be transmitted through the NB-PUSCH, then the terminal may determine the transmission scenario to which it belongs according to the information and perform the uplink power control accordingly.

In step 301, the terminal determines the uplink transmit power according to the transmission scenario to which the terminal belongs.

According to the method of implementing the uplink power control of the embodiments of the present invention, when the transmission scenario to which the terminal belongs is a fourth coverage level, the terminal determines a maximum transmit power as its uplink transmit power. For example, the fourth coverage level may be the two enhanced coverage levels like coverage level 2, coverage level 3, or the fourth coverage level may be the highest coverage level, i.e., the coverage level 3.

In this application example, since in step 300 the terminal determines that its coverage level is the coverage level 3, which belongs to the fourth coverage level, then the terminal determines the maximum transmit power as its uplink transmit power.

In step 302, the terminal uses the determined uplink transmit power for uplink transmission.

Application Example 2

Examples of this application include firstly determining a transmission scenario to which the terminal belongs.

The terminal may determine the transmission scenario to which the terminal belongs according to at least one of the following factors: the transmission capability or mode, the number of subcarriers, the coverage level, the channel type, the information to be transmitted, and the like, as described in the application example 1.

In this application example, for example, the terminal determines that it supports a multi-tone transmission with a carrier bandwidth being a fourth bandwidth (e.g., 15 kHz) according to its transmission capability or mode configuration information, and determines that the coverage level is the coverage level 1 according to the downlink measurement result, and a random access preamble is to be transmitted through NB-PRACH by using the multi-tone transmission, then the terminal may determine the transmission scenario to which it belongs according to the information and perform the uplink power control accordingly.

Secondly, the terminal determines the uplink transmit power according to the transmission scenario to which the terminal belongs.

According to the method of implementing the uplink power control of the embodiments of the present invention, when the transmission scenario to which the terminal belongs is a first coverage level and the random access preamble is to be transmitted through the NB-PRACH, the terminal determines the uplink transmit power according to the first transmit power calculation formula and the first power control parameters. For example, the first coverage level may be the coverage level 1, i.e., a normal coverage level or a basic coverage level.

In the present application example, since the terminal determines that its coverage level is the coverage level 1, which belongs to the first coverage level, and the random access preamble is to be transmitted through the NB-PRACH by using the multi-tone transmission, the terminal determines the uplink transmit power according to the first transmit power calculation formula and the first Power control parameters.

The first transmit power calculation formula is one of the following:

$$P=\min\{P\max, PL+\text{TargetPower}+(\text{Counter}-1)*\text{Step}\};$$

$$P=\min\{P\max, PL+\text{TargetPower}+\text{Delta}+(\text{Counter}-1)*\text{Step})\};$$

wherein, P is the determined uplink transmit power, Pmax is a maximum transmit power of the terminal, PL is a downlink path loss estimated by the terminal, TargetPower is a preamble initial received target power for random access, Delta is a power offset, Counter is the number of random access, Step is a power increment step.

The first transmit power calculation formula may be a transmit power calculation formula preset by the system.

The first power control parameters comprise: the preamble initial received target power for random access TargetPower, the power increment step Step, the power offset Delta;

The preamble initial reception target power for random access TargetPower is configured by the system and notified by signaling. The power increment step is configured by the system and notified by signaling or is preset by the system. The power offset Delta is configured by the system and notified by signaling or is preset by the system.

This application example is also applicable to terminals which transmit random access preamble by using NB-PRACH of other transmission capabilities or modes. For example, the terminal supports a single tone transmission of which a carrier bandwidth being a first bandwidth (for example, 3.75 kHz) and the coverage level is the coverage level 1, the terminal is to transmit the random access preamble through NB-PRACH in a single tone. Or the terminal supports a single tone transmission of which a carrier bandwidth being a second bandwidth (e.g., 15 kHz) and the coverage level is the coverage level 1, the terminal is to transmit the random access preamble through NB-PRACH in a single tone.

For situations where transmitting a random access preamble through NB-PRACH of different transmission capabilities or modes, the preamble initial received target powers for random access TargetPower, configured by the system for different transmission capabilities or modes, are different. For example, the system configures multiple preamble initial received target power parameters which are applied to different transmission capabilities or modes respectively. Or the system configures the same preamble initial received target power for different transmission capabilities or modes and uses the power offset Delta to include the power demand deviations of different transmission capabilities or modes. For example, the system configures a common preamble initial received target power parameter for different transmission capabilities or modes, and the system configures by signaling multiple sets of power offset Delta parameters applied to different transmission capabilities or modes, or the system presets different values of the power offset Delta for different transmission capabilities or modes.

In this application example, the power offset Delta may also be used to include the power demand deviations for different random access preambles. When it is required that the power offset Delta needs to include both the power demand deviations for different transmission capabilities or modes and the power demand deviations for different ransom access preambles, multiple power offset Delta parameters may be used, such as two power offsets named as Delta A and Delta B.

In this application example, for different transmission capabilities or modes, different power increment steps Step may be used. For different random access preambles, different power increment steps Step may be used. When different transmission capabilities or modes and different random access preamble are used together, different power increment steps Step may also be used. For example, the system configures by signaling or preset multiple power increment steps Step, to be applied to at least one of the following: different transmission capabilities or modes, and different random access preambles.

Finally, the terminal uses the determined uplink transmit power for uplink transmission.

Application Example 3

Examples of this application include: firstly, the terminal determines a transmission scenario to which the terminal belongs.

The terminal may determine the transmission scenario to which the terminal belongs according to one or more factors of the transmission capability or mode, the number of subcarriers, the coverage level, the channel type, the information to be transmitted, and the like, as described in the application example 1.

In this application example, for example, the terminal determines that it supports a multi-tone transmission with a carrier bandwidth being a fourth bandwidth (e.g., 15 kHz) based on configuration information of its transmission capability or mode, and it also determines that the coverage level is the coverage level 1 according to the downlink measurement result, and the uplink control information is to be transmitted through NB-PUSCH in a single tone, therefore the terminal may determine the transmission scenario to which it belongs according to the information and performs the uplink power control accordingly.

Secondly, the terminal determines the uplink transmit power according to the transmission scenario to which the terminal belongs.

According to the method for performing uplink power control of an embodiment of the present invention, when the transmission scenario to which the terminal belongs is a second coverage level and the random access procedure message Msg3, the traffic data, the uplink control information, or the traffic data and the uplink control information are to be transmitted through NB-PUSCH in a single tone, the uplink transmit power is determined according to the second transmit power calculation formula and the second power control parameters. For example, the second coverage level may be the coverage level 1, i.e., the normal coverage level or the basic coverage level.

In the present application example, since the terminal determines that the coverage level is the coverage level 1, which belongs to the second coverage level, and the uplink control information is to be transmitted through NB-PUSCH in a single tone, the terminal determines the uplink transmit power according to the second transmit power calculation formula and the second power control parameters.

The second transmit power calculation formula is one of the following formulas:

$$P=\min\{P\max, Po+PL\};$$

$$P=\min\{P\max, Po+PL+\text{Delta}\};$$

$$P=\min\{P\max, Po+PL+fi\};$$

$$P=\min\{P\max, Po+PL+\text{Delta}+fi\};$$

$$P=\min\{P\max, Po+\text{alpha}*PL\};$$

$$P=\min\{P\max, Po+\text{alpha}*PL+\text{Delta}\};$$

$$P=\min\{P\max, Po+\text{alpha}*PL+fi\};$$

$$P=\min\{P\max, Po+\text{alpha}*PL+\text{Delta}+fi\};$$

In an exemplary embodiment, the second transmit power calculation formula may be one of the following formulas:

$$P = \min\{P\max, Po+PL\};$$

$$P = \min\{P\max, Po+PL+\text{Delta}\};$$

$$P = \min\{P\max, Po+PL+fi\};$$

$$P = \min\{P\max, Po+PL+\text{Delta}+fi\};$$

wherein, P is the determined uplink transmit power, Pmax is a maximum transmit power of the terminal, Po is a target received power parameter, PL is a downlink path loss estimated by the terminal, alpha is a path loss compensation factor, Delta is a power offset, and fi is a power adjustment amount. The target received power parameter Po is the sum of a common power parameter Po_nominal and a terminal specific power parameter Po_UE.

The second transmit power calculation formula may be the transmit power calculation formula preset by the system.

The second power control parameters comprises: a common power parameter Po_nominal, a terminal specific power parameter Po_UE, a path loss compensation factor alpha, a power offset Delta, a transmit power control TPC.

The common power parameter Po_nominal is configured by the system and notified by signaling. The terminal specific power parameter Po_UE is configured by the system and notified by signaling or is preset by the system. The path loss compensation factor alpha is configured by the system and notified by signaling or is preset by the system. The power offset Delta is configured by the system and notified by signaling or is preset by the system. The transmit power control TPC is configured by the system and notified by signaling.

This application example is also applicable to terminals which transmit the uplink control information by using NB-PUSCH of other transmission capabilities or modes. For example, the terminal supports a single tone transmission of which a carrier bandwidth being a first bandwidth (for example, 3.75 kHz) and the coverage level is the coverage level 1, the terminal is to transmit the uplink control information through NB-PUSCH in a single tone. Or the terminal supports a single tone transmission of which a carrier bandwidth being a second bandwidth (e.g., 15 kHz) and the coverage level is the coverage level 1, the terminal is to transmit the uplink control information through NB-PUSCH in a single tone.

This application example is also applicable to terminals that transmit the random access procedure messages Msg3, or uplink traffic data, or uplink traffic data and uplink control information through NB-PUSCH of different transmission capabilities or modes. For example, the terminal supports a single tone transmission of which a carrier bandwidth being a first bandwidth (e.g., 3.75 kHz), the coverage level is the coverage level 1, and the terminal is to transmit the random access procedure message Msg3, or the uplink traffic data, or the uplink traffic data and the uplink control information through NB-PUSCH in a single tone. For another example, the terminal supports a single tone transmission of which a carrier bandwidth being a second bandwidth (e.g., 15 kHz), the coverage level is the coverage level 1, and the terminal is to transmit the random access procedure message Msg3, or the uplink traffic data, or the uplink traffic data and the uplink control information through NB-PUSCH in a single tone.

For the uplink transmission through the NB-PUSCH of different transmission capabilities or modes, such as the carrier bandwidth of the transmission capabilities or modes being 3.75 KHz or 15 KHz, the path loss compensation factor alpha may be different. The path loss compensation factor alpha for single tone transmission or multi-tone transmission may also be different. For example, the system configures by signaling multiple sets of path loss compensation factor alpha parameters which are applied to different transmission capabilities or modes respectively. For another example, the system preconfigures different path loss compensation factor alpha for different transmission capabilities or modes. For another example, the system preconfigures a specific value of the path loss compensation factor alpha for a specified transmission capability or mode, the system configures by signaling the path loss compensation factor alpha for other transmission capabilities or modes.

For the uplink transmission through the NB-PUSCH of different transmission capabilities or modes, such as the carrier bandwidth of the transmission capabilities or modes being 3.75 KHz or 15 KHz, the configured common power parameter Po_nominal may be different. For example, the system configures multiple sets of common power parameter Po_nominal which are applied to different transmission capabilities or modes respectively. For another example, the configured common power parameter Po_nominal is the same, e.g., the system configures a common power parameter Po_nominal for different transmission capabilities or modes, and when the configured common power parameter Po_nominal is the same, the terminal specific power parameter Po_UE may be used to carry the power demand deviations of different transmission capabilities or modes, or the power offset Delta may be used to carry the power demand deviations of different transmission capabilities or modes, which can be configured by the system and notified to the terminal by signaling or is preset by the system, or the power adjustment amount fi may be used to include the power demand deviations of different transmission capabilities or modes, or the value of the transmission resource bandwidth M may be set according to the difference between the bandwidth of the preset transmission capability or mode and the bandwidth of one of the various transmission capabilities or modes.

The power demand deviation for different transmission capabilities or modes may be carried by the terminal specific power parameter Po_UE, which can be implemented as below: For example, when the system configures the terminal specific power parameter Po_UE for a terminal with different transmission capabilities or modes, the system carries out the parameter configuration considering the power demand deviation for different transmission capabilities or modes. In addition, for different transmission capabilities or modes, the value range of the terminal specific power parameter Po_UE may be different, for example, the system configures multiple sets of the terminal specific power parameter Po_UE with different value ranges, which are applied to different transmission capabilities or modes respectively.

The power demand deviation for different transmission capabilities or modes may be carried by the power offset Delta, which can be implemented as below: For example, the system configures by signaling multiple sets of power offset Delta parameters which are applied to different transmission capabilities or modes respectively. For another example, the system presets different values of power offset Delta for different transmission capabilities or modes, e.g., Delta is set to 0 when the 3.75 kHz carrier bandwidth is used for transmission, Delta is set to 10*log 10(4)=6 dB when the 15 kHz carrier bandwidth is used for transmission; or, Delta is set to 0 when the 15 kHz carrier bandwidth is used for transmission, Delta is set to $-10*\log 10 (4)=-6$ dB when the 3.75 kHz carrier bandwidth is used for transmission.

The power demand deviation for different transmission capabilities or modes may be carried by the power adjustment amount fi, which can be implemented as below: For example, the adjustment amount fi is initialized according to the power demand deviation for different transmission capabilities or modes, e.g., when the 3.75 kHz carrier bandwidth is used for transmission, fi is initialized to 0, when the 15 kHz carrier bandwidth is used for transmission, fi is initialized to $10*\log 10 (4)=6$ dB; or, when the 15 kHz carrier bandwidth is used for transmission, fi is initialized to 0, when the 3.75 kHz carrier bandwidth is used for transmission, fi is initialized to $-10*\log 10 (4)=-6$ dB.

The value of the transmission resource bandwidth M may be set according to the difference between the bandwidth of the preset transmission capability or mode and the bandwidth of a different transmission capability or mode, which includes: setting the value of transmission resource bandwidth M according to the preset transmission capability or mode, and for other transmission capabilities or modes having a bandwidth different from the bandwidth of the preset transmission capability or the mode, setting the value of transmission resource bandwidth M according to the bandwidth difference. For example, setting transmission through 3.75 kHz carrier bandwidth as a benchmark, when the 15 kHz carrier bandwidth is used for single tone transmission, the value of transmission resource bandwidth M value is set to 4. For another example, setting transmission through 15 kHz carrier bandwidth as a benchmark, when the 3.75 kHz carrier bandwidth is used for single tone transmission, the value of the transmission resource bandwidth M is set to ¼.

The power offset Delta may also include at least one of the following: a power demand deviation between different modulation and coding schemes, a power demand deviation between the transmission of traffic data and the transmission of uplink control information, a power demand deviation between the transmission of traffic data and uplink control information and the transmission of uplink control information. The system may also implement these different functions by using multiple power offset parameters.

When the random access procedure message Msg3 is transmitted through the NB-PUSCH, the common power parameter Po_nominal may be the sum of the random access preamble initial received target power TargetPower and the power offset Delta_Msg3 configured by the system through signaling or preset by the system. The value of Delta_Msg3 may be determined by at least one of the following conditions: when NB-PRACH and Msg3 use the same transmission capability or mode, and the difference of power demand or SNR between NB-PRACH and Msg3 is small, Delta_Msg3 may use a value of which the absolute value is small; when NB-PRACH and Msg3 use different transmission capabilities or modes, and the difference of power demand or SNR between NB-PRACH and Msg3 is large, Delta_Msg3 may use a value of which the absolute value is large.

Finally, the terminal uses the determined uplink transmit power for uplink transmission.

Application Example 4

Examples of this application include: firstly the terminal determines a transmission scenario to which the terminal belongs.

The terminal may determine the transmission scenario to which the terminal belongs according to one or more factors of the transmission capability or mode, the number of subcarriers, the coverage level, the channel type, the information to be transmitted, and the like, as described in the application example 1.

In this application example, for example, the terminal determines that it supports a multi-tone transmission with a carrier bandwidth being a fourth bandwidth (e.g., 15 kHz) based on configuration information of its transmission capability or mode, and it also determines that the coverage level is the coverage level 1 according to the downlink measurement result, and the uplink traffic data is to be transmitted through NB-PUSCH in a multi-tone, therefore the terminal may determine the transmission scenario to which it belongs according to the information and performs the uplink power control accordingly.

Secondly, the terminal determines the uplink transmit power according to the transmission scenario to which the terminal belongs.

According to the method for performing uplink power control of an embodiment of the present invention, when the transmission scenario to which the terminal belongs is a third coverage level and the random access procedure message Msg3, the traffic data, the uplink control information, or the traffic data and the uplink control information are to be transmitted through NB-PUSCH, the uplink transmit power is determined according to the third transmit power calculation formula and the third power control parameter. For example, the third coverage level may be the coverage level 1, i.e., the normal coverage level or the basic coverage level.

In the present application example, since the terminal determines that the coverage level is the coverage level 1, which belongs to the third coverage level, and the uplink traffic data is to be transmitted through NB-PUSCH in a multi-tone, the terminal determines the uplink transmit power according to the third transmit power calculation formula and the third power control parameters.

The third transmit power calculation formula is one of the following formulas:

$P=\min\{P\max, Po+PL\};$ $P=\min\{P\max, Po+PL+\text{Delta}\};$ $P=\min\{P\max, Po+PL+fi\};$ $P=\min\{P\max, Po+PL+\text{Delta}+fi\};$ $P=\min\{P\max, Po+\text{alpha}*PL\};$ $P=\min\{P\max, Po+\text{alpha}*PL+\text{Delta}\};$ $P=\min\{P\max, Po+\text{alpha}*PL+fi\};$ $P=\min\{P\max, Po+\text{alpha}*PL+\text{Delta}+fi\};$ $P=\min\{P\max, 10*\log 10(M)+Po+PL\};$ $P=\min\{P\max, 10*\log 10(M)+Po+PL+\text{Delta}\};$ $P=\min\{P\max, 10*\log 10(M)+Po+PL+fi\};$ $P=\min\{P\max, 10*\log 10(M)+Po+PL+\text{Delta}+fi\};$ $P=\min\{P\max, 10*\log 10(M)+Po+\text{alpha}*PL\};$ $P=\min\{P\max, 10*\log 10(M)+Po+\text{alpha}*PL+\text{Delta}\};$ $P=\min\{P\max,10*\log 10(M)+Po+\text{alpha}*PL+fi\};$ $P=\min\{P\max,10*\log 10(M)+Po+\text{alpha}*PL+\text{Delta}+fi\};$ In an exemplary embodiment, the third transmit power calculation formula may be one of the following formulas:

$P=\min\{P\max,10*\log 10(M)+Po+\text{alpha}*PL\};$ $P=\min\{P\max,10*\log 10(M)+Po+\text{alpha}*PL+\text{Delta}\};$ $P=\min\{P\max,10*\log 10(M)+Po+\text{alpha}*PL+fi\};$ $P=\min\{P\max,10*\log 10(M)+Po+\text{alpha}*PL+\text{Delta}+fi\};$ wherein, P is the determined uplink transmit power, Pmax is a maximum transmit power of the terminal, Po is a target received power parameter, PL is a downlink path loss estimated by the terminal, alpha is a path loss compensation factor, Delta is a power offset, fi is a power adjustment amount, and M is a transmission resource bandwidth.

The target received power parameter Po is the sum of a common power parameter Po_nominal and a terminal specific power parameter Po_UE.

The transmission resource bandwidth M may include at least one of the following: the number of subcarriers, the number of resource units, the number of resource blocks. For example, M may be the number of subcarriers.

The third transmit power calculation formula may be the transmit power calculation formula preset by the system.

The third power control parameters comprises: a transmission resource bandwidth M, a common power parameter Po_nominal, a terminal specific power parameter Po_UE, a path loss compensation factor alpha, a power offset Delta, a transmit power control TPC.

The transmission resource bandwidth M is configured by the system and notified by signaling or is preset by the system. The common power parameter Po_nominal is configured by the system and notified by signaling. The terminal specific power parameter Po_UE is configured by the system and notified by signaling or is preset by the system. The path loss compensation factor alpha is configured by the system and notified by signaling or is preset by the system. The power offset Delta is configured by the system and notified by signaling or is preset by the system. The transmit power control TPC is configured by the system and notified by signaling.

The downlink path loss PL is estimated by the terminal according to the downlink reference signal, and the system transmits the reference signal power to the terminal by signaling. The terminal obtains the reference signal received power by measurement and uses the difference between the reference signal power and reference signal received power as the estimated value of the downlink path loss PL.

The NB-IoT system currently includes three deployment scenarios, i.e., Stand-alone, using Guard-band of an LTE system, and using a physical resource block of an LTE system (In-band). For stand-alone scenario, the NB-IoT system uses independent carrier resource and may exclusively have the downlink transmission power for the independent carrier resource. For the Guard-band scenario, the NB-IoT system uses a resource block located in the LTE carrier Guard-band, and the NB-IoT system may exclusively have the downlink transmission power for the resource block or share the downlink transmission power with the LTE system. For the In-band scenario, the NB-IoT system uses a resource block located on the LTE carrier and needs to share the downlink transmission power with the LTE system. For these three scenarios, the NB-IoT system may configure corresponding reference signal power parameters according to the usage of the downlink transmit power and transmit the parameters by signaling to the terminal for PL estimation. As the bandwidth of the NB-IoT system is very narrow, when the terminal obtains the reference signal received power by measurement, such measurement and processing may be carried out in multiple time domain sub-frames in order to improve the accuracy of measurement.

The present application example is also applicable to a terminal transmitting a random access procedure message Msg3, or traffic data, or uplink control information, or traffic data and uplink control information through NB-PUSCH in a single tone. For these terminals, the value of the number of subcarriers M is 1, and the value of the number of subcarriers M may be set to 1 by default, which needs no configuration by the system and notification by signaling.

This application example is also applicable to terminals that transmit the random access procedure messages Msg3, or uplink traffic data, or uplink control information, or uplink traffic data and uplink control information through NB-PUSCH of different transmission capabilities or modes. For example, the terminal supports a single tone transmission of which a carrier bandwidth being a first bandwidth (e.g., 3.75 kHz), the coverage level is the coverage level 1, and the terminal is to transmit the random access procedure message Msg3, or the uplink traffic data, or the uplink traffic data and the uplink control information through NB-PUSCH in a single tone. For another example, the terminal supports a single tone transmission of which a carrier bandwidth being a second bandwidth (e.g., 15 kHz), the coverage level is the coverage level 1, and the terminal is to transmit the random access procedure message Msg3, the uplink traffic data, or the uplink traffic data and the uplink control information through NB-PUSCH in a single tone.

For the uplink transmission through the NB-PUSCH of different transmission capabilities or modes, such as the carrier bandwidth of the transmission capabilities or modes being 3.75 KHz or 15 KHz, the path loss compensation factor alpha may be different. The path loss compensation factor alpha for single tone transmission or multi-tone transmission may also be different.

For the uplink transmission through the NB-PUSCH of different transmission capabilities or modes, such as the carrier bandwidth of the transmission capabilities or modes being 3.75 KHz or 15 KHz, the configured common power parameter Po_nominal may be different. Or the configured common power parameter Po_nominal is the same, and the terminal specific power parameter Po_UE may be used to carry the power demand deviations of different transmission capabilities or modes, or the power offset Delta may be used to carry the power demand deviations for different transmission capabilities or modes, and is configured by the system and notified to the terminal by signaling or is preset by the system, or the power adjustment amount fi may also be used to include the power demand variations for different transmission capabilities or modes, or the value of the transmission resource bandwidth M may be set according to the difference between the bandwidth of the preset transmission capability or mode and the bandwidth of one of various transmission capabilities or modes.

The power offset Delta may also include at least one of the following: a power demand deviation between different modulation and coding schemes, a power demand deviation between the transmission of traffic data and the transmission of uplink control information, a power demand deviation between the transmission of traffic data and uplink control information and the transmission of uplink control information. The system may also implement these different functions by using multiple power offset parameters.

Finally, the terminal uses the determined uplink transmit power for uplink transmission.

Application Example 5

Examples of this application include: firstly the terminal determines a transmission scenario to which the terminal belongs.

The terminal may determine the transmission scenario to which the terminal belongs according to one or more factors of the transmission capability or mode, the number of subcarriers, the coverage level, the channel type, the information to be transmitted, and the like, as described in the application example 1.

Secondly, the terminal determines the uplink transmit power according to the transmission scenario to which the terminal belongs.

In this application example, the terminal determines the uplink transmit power according to the coverage level to which the terminal belongs and relationship information between the coverage level and a power level preset by the system.

In this application example, the relationship information between the coverage level and the power level preset by the system, for example, may be shown in Table 1 below. The coverage level 1 corresponds to the power level range [x~y] dBm, the coverage level 2 corresponds to the power level range [p~q] dBm, and the coverage level 3 corresponds to the maximum transmit power level. The power level range corresponding to the coverage level 2 may be higher than the power level range corresponding to the coverage level 1, for example, [x~y] dBm may be (0~10] dBm, [p~q] dBm may be (10~23] dBm, the maximum transmit power is 23 dBm.

The terminal may determine the uplink transmit power according to its coverage level and the relationship information. When a coverage level corresponds to a plurality of power levels or a power level range, the terminal may further determine the power level to be used according to, for example, the downlink reference signal measurement result, as the uplink transmit power.

TABLE 1

| Coverage level | Power level |
| --- | --- |
| Coverage level 1 | [x~y] dBm |
| Coverage level 2 | [p~q] dBm |
| Coverage level 3 | Maximum transmit power |

In this application example, the terminal may also adjust the determined uplink transmit power according to the transmit power control (TPC) command. For example, the power adjustment fi is initialized according to the system preset rule (e.g., initialized to 0) and then calculated according to the power adjustment mode and the power adjustment step corresponding to the received transmit power control (TPC) command to determine the power adjustment amount fi.

The power adjustment mode can be a cumulative adjustment mode or an absolute adjustment mode, which is configured by the system through signaling or is preset by the system.

The power adjustment step corresponding to the transmit power control (TPC) may be a value which has a larger absolute value for quickly tracking and adjusting the transmission performance.

The above application example may not only guarantee the performance of the NB-IoT uplink transmission, but also reduce the complexity of uplink power control of the NB-IoT.

In addition, embodiments of the present invention also provide a computer-readable storage medium storing computer-executable instructions that implement the above-described method of performing uplink power control when executed by a processor.

It will be understood by those of ordinary skill in the art that functional modules/units in all or some of the steps, systems, and devices described in the methods disclosed herein may be implemented as software, firmware, hardware, and suitable combinations thereof. In the hardware embodiment, the division between the functional modules/units mentioned in the above description does not necessarily correspond to the division of the physical unit. For example, a physical component may have multiple functions, or a function or step may be performed by the cooperation of several physical components. Some components or all components may be implemented as software executed by a processor, such as a digital signal processor or microprocessor, or implemented as hardware, or implemented as an integrated circuit, such as a specific integrated circuit. Such software may be distributed on a computer-readable medium, which may include computer storage media (or non-transitional media) and communication media (or transitional media). As is well known to those of ordinary skill in the art, the term computer storage medium includes both of volatile and nonvolatile, removable and non-removable media implemented in any method or technique for storing information such as computer readable instructions, data structures, program modules, or other data. Computer storage media includes, but is not limited to, RAM, ROM, EEPROM, flash memory or other memory technology, CD-ROM, digital versatile disk (DVD) or other optical disk storage, magnetic box, magnetic tape, magnetic disk storage or other magnetic storage device, any other medium used to store the desired information and which can be accessed by the computer. In addition, it is well known to those of ordinary skill in the art that the communication medium typically comprises computer readable instructions, data structures, program modules, or other data in modulation data signals such as carriers or other transmission mechanisms, and may include any information delivery media.

While the embodiments disclosed herein are as mentioned above, the description is for ease of understanding of the present application and is not intended to be limiting of the present application. Any person skilled in the art to which this application pertains may make any modifications and variations in the form and details of the application without departing from the spirit and scope of the present application, but the scope of patent protection of the present application remains as defined in the appended claims.

INDUSTRIAL UTILITY

The embodiments of the present application provide a method and a terminal for realizing the uplink power control. The terminal determines the uplink transmit power and carries out uplink transmission, which realizes the design of the uplink power control scheme.

What is claimed is:

1. A method performed by a wireless communication device, comprising:

determining a first uplink transmit power for a first transmission mode according to a formula: min{Pmax, 10*log 10(M)+Po+alpha*PL+Delta+fi}, wherein Pmax is a maximum transmit power of the wireless communication device, Po is a target received power parameter, PL is a downlink path loss estimated by the wireless communication device, alpha is a path loss compensation factor, Delta is a power offset, fi is a power adjustment amount, and M is a resource bandwidth, wherein the target received power parameter Po is a sum of a common power parameter Po_nominal and a specific power parameter Po_UE, and wherein the value of the resource bandwidth M is determined according to a preconfigured transmission mode, and a difference between a carrier bandwidth of the first transmission mode and a carrier bandwidth of the preconfigured transmission mode, wherein the preconfigured transmission mode includes one of the following: a first multi-tone transmission with a carrier bandwidth being a first bandwidth, and a second multi-tone transmission with a carrier bandwidth being a second bandwidth, wherein the first bandwidth is different from the second bandwidth.

2. A non-transitory computer-readable medium having stored thereon computer-executable instructions that when executed carry out a method, the method comprising:

determining a first uplink transmit power for a first transmission mode according to a formula: min{Pmax, 10*log 10(M)+Po+alpha*PL+Delta+fi}, wherein Pmax is a maximum transmit power of the wireless communication device, Po is a target received power parameter, PL is a downlink path loss estimated by the wireless communication device, alpha is a path loss compensation factor, Delta is a power offset, fi is a power adjustment amount, and M is a resource bandwidth, wherein the target received power parameter Po is a sum of a common power parameter Po_nominal and a specific power parameter Po_UE, and wherein the value of the resource bandwidth M is determined according to a preconfigured transmission mode, and a difference between a carrier bandwidth of the first transmission mode and a carrier bandwidth of the preconfigured transmission mode, wherein the preconfigured transmission mode includes one of the following: a first multi-tone transmission with a carrier bandwidth being a first bandwidth, and a second multi-tone transmission with a carrier bandwidth being a second bandwidth, wherein the first bandwidth is different from the second bandwidth.

3. An apparatus, comprising:

a memory; and at least one processor coupled to the memory, the at least one processor configured to:

determine a first uplink transmit power for a first transmission mode according to a formula: min{Pmax, 10*log 10(M)+Po+alpha*PL+Delta+fi}, wherein Pmax is a maximum transmit power of the wireless communication device, Po is a target received power parameter, PL is a downlink path loss estimated by the wireless communication device, alpha is a path loss compensation factor, Delta is a power offset, fi is a power adjustment amount, and M is a resource bandwidth, wherein the target received power parameter Po is a sum of a common power parameter Po_nominal and a specific power parameter Po_UE, and wherein the value of the resource bandwidth M is determined according to a preconfigured transmission mode, and a difference between a carrier bandwidth of the first transmission mode and a carrier bandwidth of the preconfigured transmission mode, wherein the preconfigured transmission mode includes one of the following: a first multi-tone transmission with a carrier bandwidth being a first bandwidth, and a second multi-tone transmission with a carrier bandwidth being a second bandwidth, wherein the first bandwidth is different from the second bandwidth.

* * * * *